3,795,636
PROCESS FOR THE PREPARATION OF POLY-
URETHANE FOAMS AND MICROCELLULAR
ELASTOMERS WITH INTEGRAL SKINS AND
POLYOL EXTENDER SYSTEM FOR THE
PREPARATION THEREOF
George W. Huffman, Crystal Lake, and Norman E.
Rustad, Barrington, Ill., assignors to The Quaker Oats
Company, Chicago, Ill.
No Drawing. Filed Jan. 12, 1972, Ser. No. 217,282
Int. Cl. C08g 22/08, 22/48
U.S. Cl. 260—2.5 AZ                 2 Claims

ABSTRACT OF THE DISCLOSURE

This invention relates to a method for preparing polyurethane foams and microcellular elastomers with integral skins which are substantially non-porous, said method comprising contacting a mixture of specified polyols with a specified quasi-prepolymer of toluene diisocyanate in the presence of a blowing agent and a catalyst system consisting of a tetraalkylguanidine and specified organometallic compounds.

This invention further relates to a liquid extender system which is homogeneous and stable at room temperature consisting essentially of polytetramethylene ether glycol, a low molecular weight triol, a low molecular weight diol, and ethylene oxide capped 4,4'-isopropylidenediphenol in certain specified proportions, said extender system is useful in the preparation of said polyurethane foams and microcellular elastomers with integral skins.

BACKGROUND OF THE INVENTION

Field of the invention

This invention concerns a novel process and a novel extender system useful in the preparation of certain polyurethane foams and microcellular elastomers with integral skins.

Description of the prior art

One of the most significant contributions to the growth of polyurethane technology in recent years is the development of polyurethane foams and microcellular elastomers with integral skins. Integral skin foams and microcellular elastomers, when molded, form their own tough skin which takes on the exact pattern of the mold. This eliminates the separate process of encapsulating the foam or microcellular elastomer in a skin after its formation. A considerable savings in labor cost is thus realized.

Various methods have been proposed to fabricate polyurethane foams and microcellular elastomers with integral skins. U.S. Pat. No. 3,527,852 discloses one such method. The latter scheme relies on rotating the mold to produce the integral skin. It is apparent that it would be highly desirable to provide a method of manufacturing polyurethane foams and microcellular elastomers with integral skins which does not require the rotation, rocking, agitation, etc. of the mold.

Polyurethane foams and microcellular elastomers with integral skins have been made with chlorinated aromatic diamines and modified diphenylmethane diisocyanate or quasi-prepolymers of toluene diisocyanate to obtain the necessary skin properties to resist abuse. These systems based on aromatic diamines are highly reactive, yielding very short handling times, and are also expensive. Often these foams or microcellular elastomers tend to discolor top protective coatings. Furthermore, many of the chlorinated aromatic diamines must be heated to be rendered fluid and useful. Melting the solid diamine is inconvenient and in some cases hazardous. For example, 4,4'-methylenebis(2-chloroaniline) gives off potentially carcinogenic vapors at its melting point. Consequently, many searchers have looked for systems which contain no chlorinated aromatic diamine but produce a foam or microcellular elastomer with a tough skin which is substantially non-porous.

SUMMARY OF THE INVENTION

It is an object of this invention to provide a liquid extender system which is homogeneous and stable at room temperature and which is useful in the preparation of certain polyurethane foams and microcellular elastomers with integral skins.

Another object of this invention is to provide a process for the manufacture of certain polyurethane foams and microcellular elastomers with integral skins which eliminates the use of chlorinated aromatic diamines.

Still another object of this invention is to provide a process for preparing certain polyurethane foams and microcellular elastomers with integral skins wherein the mold is not rocked.

Yet another object of this invention is to provide a process which is useful in the preparation of certain polyurethane foams and microcellular elastomers having integral skins which are substantially non-porous and having good tear strength.

Still yet another object of this invention is to provide a process for the preparation of certain polyurethane foams and microcellular elastomers with integral skins wherein the polyurethane product can be demolded in about 10 minutes.

The objects of this invention are accomplished by a molding method for preparing polyurethane foams and microcellular elastomers with integral skins which comprises the sequential steps of (a) Contacting under substantially anhydrous conditions (1) an ethylene oxide capped propylene oxide adduct of a first triol having about 40 to about 75 percent primary hydroxyl and an average molecular weight of about 2000 to about 7000;
(2) polytetramethylene ether glycol having an average molecular weight between 500 and 1000;
(3) a diol;
(4) ethylene oxide capped 4,4'-isopropylidene-diphenol; and
(5) a second triol simultaneously with a quasi-prepolymer of toluene diisocyanate and a third triol; in the presence of a catalyst system consisting of a tetraalkylguanidine or an isocyanate adduct thereof and an organometallic compound selected from the group consisting of organotin compounds and organomercury compounds; and in the presence of a blowing agent which vaporizes under the contacting conditions;

(b) Pouring the contacted mixture into a mold which is preheated to a temperature between about 30° C. and 55° C.;

(c) Permitting the contents of the mold to cure in contact with the mold; and (d) Removing the resulting self-supporting polyurethane product from the mold.

The objects of this invention are further accomplished by a homogeneous liquid polyurethane extender system which consists essentially of 20 to 60 percent by weight of polytetramethylene ether glycol having an average molecular weight between 500 and 1000; 10 to 50 percent by weight of a diol selected from the group consisting of ethylene glycol, diethylene glycol, 1,4-butanediol, and phenyldiethanolamine; 10 to 20 percent by weight of ethylene oxide capped 4,4'-isopropylidenediphenol, herein-after sometimes referred to as ethylene oxide capped bisphenol A; and 0.5 to 10 percent by weight of a triol selected from the group consisting of glycerol, trimethylolpropane, 1,2,4-butanetriol, 1,2,6-hexanetriol, and triethanolamine. Percentages are based on the weight of the total extender system.

It is to be understood that by homogeneity we mean that the liquid extender system of this invention does not separate into different phases at room temperature. Throughout this application room temperature is to be taken to mean 26° C. It is further to be understood that by liquidity we mean that the extender of this invention had a viscosity of or less than 300 centipoises at room temperature.

The term ethylene oxide capped propylene oxide adduct of a triol is to be understood to mean that propylene oxide has been permitted to react with the first triol to form an adduct and subsequently ethylene oxide has been permitted to react with the adduct to produce a product having 40 to 75 percent primary hydroxyl and an average molecular weight between 2000 and 7000. Suitable triols include aliphatic triols having a molecular weight less than 500 such as trimethylolpropane; glycerol; 1,2,4-butanetriol; and 1,2,6-hexanetriol.

Trimethylolpropane and glycerol ethylene oxide capped propylene oxide adducts are commercially available and are sold under the following trademarks: "Voranol CP 4701" by Dow Chemical Company, Midland, Mich.; "Thanol SF 6500," "Thanol SF 6501," "Thanol TE 4501," and "Thanol TE 3500" by Jefferson Chemical Company, Inc., Houston, Texas; and "Pluracol TPE 4542" by Wyandotte Chemical Corporation, Wyandotte, Mich. If much less than about 40 percent primary hydroxyl is present our process cannot be used to produce a foamed polyurethane elastomer having an integral skin which is substantially non-porous. Ethylene oxide capped polypropylene oxide adduct having much more than 75 percent primary hydroxyl is not readily available.

The polytetramethylene ether glycol used in our process and liquid extender system has an average molecular weight between about 500 and about 1000. The formation of open cells in integral skin foams is critical. A large number of closed cells in the foam will cause collapse of the foamed casting. The reason for this is that as the newly formed casting cools the trapped blowing agent condenses and a vacuum forms causing the flexible cells to shrink. With open cells there is a free flow of gasses and, thus, no vacuums are created. The amount of polytetramethylene ether glycol used in our process should be about 5 to 15 percent by weight based on the weight of the total reactants. Throughout this application, the weight of the total reactants is the weight of the total formulation minus the weight of the blowing agent and catalysts. Where the homogeneous liquid extender is to be used in our process, the polytetramethylene ether glycol must be present in an amount 20 to 60 percent based on the weight of the total extender system.

Broadly speaking, the diols useful in our process are aliphatic or aromatic glycols having a molecular weight below 500 such as ethylene glycol, diethylene glycol, 1,4-butanediol, and phenyldiethanolamine. The particular low molecular weight diol or combination thereof chosen from the group consisting of ethylene glycol, diethylene glycol, and 1,4-butanediol depends upon the properties desired in the product. In general about 1 to 10 percent by weight based on the weight of the total reactants should be diol. Considering the price as an important factor, we prefer to use ethylene glycol. In the liquid homogeneous extender of our invention we use 10 to 50 percent by weight of the above diols based on the weight of the total extender system.

The term ethylene oxide capped bisphenol A is to be understood to mean that ethylene oxide has been permitted to react with bisphenol A in a molar ratio greater than 2 to 1 and the capped adduct preferably has an average molecular weight about 500. It is essential to our process and in our liquid extender system that about 10 to 20 percent by weight of ethylene oxide capped bisphenol A be present in our formulation based on the weight of the extender system, generally, and in the case where our novel extender system is used in our process based on the weight of the extender system, specifically. The term "polyol extender" as used herein is to be distinguished from the term "extender system" as above described. It is to be understood that "polyol extender" encompasses the specific "extender system" described above but includes systems not included in the "extender system." The "extender system" is to be taken to mean the combination of the polytetramethylene ether glycol, diol, ethylene oxide capped bisphenol A, and the second triol.

About 0.5 to 10 percent by weight of said second triol is necessary in our process as a crosslinking agent in order to entrap the blowing agent and to provide a high quality foam or microcellular elastomer. Suitable triols include aliphatic triols having a molecular weight less than 500 such as trimethylol propane; glycerol; 1,2,4-butanetriol; and 1,2,6-hexanetriol. Other suitable crosslinking triols include triethanolamine. The percentage of said second triol is expressed in terms of the weight of the polyol extender. About 0.5 to 10 percent by weight based on the weight of the extender system of the specified triols is also necessary in our extender system.

It is particularly important to our process that the necessary crosslinking be provided by a combination of the second triol and a quasi-prepolymer of toluene diisocyanate and the third triol. Suitable triols useful in the quasi-prepolymer are by way of example aliphatic triols having a molecular weight less than 500 such as glycerol; trimethylolpropane; 1,2,4-butanetriol; and 1,2,6-hexanetriol. The quasi-prepolymer is prepared by conventional procedures from 2,4-toluene diisocyanate; 2,6-toluene diisocyanate; or mixtures thereof and the specified triols and has an NCO content of about 20 to 40 percent. The amount of quasi-prepolymer used in our process, whether or not our liquid homogeneous extender system is used, should be approximately the theoretical amount necessary to react with the total polyols (ethylene oxide capped propylene oxide adduct, polytetramethylene ether glycol, diol, second triol, and ethylene oxide capped 4,4'-isopropylidenediphenol). We have found that as little as 90 percent of the theoretical amount of quasi-prepolymer is satisfactory.

The selection of the catalyst system is critical in the practice of the above process. A combination of tetraalkylguanidine or an isocyanate adduct thereof and an organometallic compound selected from the group consisting of organomercury compounds and organotin compounds gives a desirable rise time and demolding time. The rise time is the time necessary for the foam to reach its maximum size and the demolding time is the time necessary for the foam to become sufficiently cured that it will not slump when it is demolded and left unsupported.

The tetraalkylguanidines useful as co-catalysts in the above process are compositions of the formula:

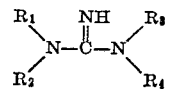

where $R_1$, $R_2$, $R_3$, and $R_4$ are the same or different and are phenyl groups or alkyl groups having between 1 and 6 carbon atoms inclusive. The alkyl groups can be methyl, ethyl, propyl, butyl, pentyl, or hexyl and where the alkyl group contains three or more carbon atoms may be straight or branched chain. We prefer to use tetramethylguanidine inasmuch as it is the cheapest tetraalkylguanidine of the above formula available.

The isocyanate adducts of the above mentioned tetraalkylguanidines may be formed by reacting the tetraalkylguanidine with an isocyanate. Suitable isocyanate include both aliphatic and aromatic polyisocyanates. Representative aliphatic polyisocyanates include 1,4-tetramethylene diisocyanate and 1,6-hexamethylene diisocyanate. Examples of suitable aromatic polyisocyanates are toluene diisocyanate; diphenyl methane diisocyanate; phenylisocyanate, and chlorophenylisocyanate.

Organomercury compounds useful as co-catalysts for example are phenyl and cresyl mercuric salts of aliphatic acids having between 2 and 12 carbon atoms. Where the aliphatic acid contains three or more carbon atoms, the carbon chain may be straight or branched. Satisfactory organomercury compounds are, by way of example, phenyl mercuric acetate, phenyl mercuric propionate, phenyl mercuric butyrate, phenyl mercuric laurate, p-cresyl mercuric propionate, m-cresyl mercuric propionate, etc. We prefer to use phenyl mercuric propionate.

Among the organotin compounds which we have found useful are stannous acylates such as stannous acetate, stannous octoate, stannous laurate, stannous oleate, etc.; dialkyltin salts of carboxylic acids, e.g., dibutyltin diacetate, dibutyltin dilaurate, dibutyltin maleate, dilauryltin diacetate, dioctyltin diacetate, etc.

The tetraalkylguanidine or isocyanate adduct thereof is present in an amount sufficient to provide a slow even rise. We prefer a rise time of about 40 to 70 seconds. For most purposes about 0.1 to 1 percent by weight of tetraalkylguanidine or a corresponding equivalent of the isocyanate adduct thereof based on the total weight of the reactants is sufficient. The metallic compound should be present in an amount sufficient to give a demolding time about 10 minutes. Generally about 0.01 to 0.1 percent by weight of organotin compound or about 0.1 to 1 percent of organomercury compound based on the total weight of the reactants is satisfactory.

The foaming operation is effected by means of a blowing agent which vaporizes under the contacting conditions. Preferred blowing agents are methylenedichloride, trichlorofluoromethane, and 1,2,2-trichloro-1,1,2-trifluoroethane.

Increasing the fluorocarbon blowing agent will decrease the microcellular polyurethane elastomer density up to a point. As is known in the art at some point the evaporation of the blowing agent consumes too much exothermic heat, causing insufficient blowing and improper cure. The density of the resultant foam or microcellular elastomer should be between about 5 and 60 pounds per cubic foot. The skin thickness of the product foam or microcellular elastomer is affected by the boiling point of the blowing agent. In general the higher the boiling point of the blowing agent, the thicker the integral skin.

When the density is at the lower end of the range, the product is a foam, and when the density is at the upper end of the range, the product is a microcellular elastomer. Products in the intermediate range will be stiff foams. To produce a foam with a density of 10 pounds per cubic foot for example we have found that 10 percent by weight of trichlorofluoromethane is sufficient blowing agent. On the other hand, to produce a microcellular elastomer with a density of 45 pounds per cubic foot for example, 1 to 2 percent by weight of methylene dichloride is sufficient.

Optional additives such as stabilizers, fillers, colorants, processing aids, surfactants, lubricants, plasticizers, etc., can be incorporated into the foams or microcellular elastomers prepared by our process if desired.

In practicing our process the ethylene oxide capped propylene oxide adducts, polytetramethylene ether glycol, diol, second triol, ethylene oxide capped bisphenol A, quasi-prepolymer, catalyst system, and blowing agent are contacted simultaneously under substantially anhydrous conditions. By substantially anhydrous conditions we mean that no more than 0.1 percent by weight of water based on the weight of the total reactants be present. The contacting is at ambient temperature, usually around 26° C. The reaction mixture is dumped into a mold which is heated to a temperature between 30° C. and 55° C. The mold temperature, as well as the boiling point, of the blowing agent affects the thickness of the integral skin. We have found that the higher the temperature of the mold in the above range, the thinner the skin. After curing at ambient temperature for about 10 minutes, the product is removed from the mold and may be heat aged in some cases to improve its properties.

The contacting may be accomplished by rapid hand mixing or by mixing in a foaming machine. Any or all of the polyols, i.e., ethylene oxide capped propylene oxide adduct, polytetramethylene ether glycol, diol, second triol, and ethylene oxide capped 4,4'-isopropylidenediphenol, may be premixed.

The use of our novel homogeneous liquid extender system, the components of which are described above, is convenient in our process. The extender system may be prepared in advance and stored until needed. Our extender is prepared by mixing the polyol components in the above described amounts. The amount of each component is very important to the homogeneity and stability of our extender system. For example, the triethanolamine and the ethylene glycol specified above will not remain dissolved in the polytetramethylene ether glycol alone. Surprisingly it was found that if about 10 to 20 percent by weight of ethylene oxide capped bisphenol A was included, based on the weight of the extender system, the extender system was homogeneous and stable.

The catalyst may be premixed with any or all of the polyols. We prefer either of the following techniques: Ethylene oxide capped propylene oxide adduct, polytetramethylene ether glycol, diol, second triol, ethylene oxide capped bis-phenol A, catalyst system, and the blowing agent are mixed and pumped into a mixing head. Where our novel extender system is used, the ethylene oxide capped propylene oxide adduct, the extender system, catalyst system, and blowing agent are mixed into the mixing head. In both cases, the toluene diisocyanate quasi-prepolymer is also pumped into the mixing head in a separate stream and is thoroughly mixed with the first stream by a stirrer present in the head.

Alternatively, the blowing agent, organometallic compound may be mixed in a part of the ethylene oxide capped propylene oxide adduct and introduced into the mixing head in a third stream.

In either case, from the mixing head, the material is deposited into a heated mold which is moved relative to the mixing head in order to provide a layer of reactants on the bottom thereof. Thus, it is apparent that the process of our invention can be used with any of the usual mixing procedures of making foams by microcellular elastomers without requiring expensive and undesirable alterations.

The products of the process of the present invention are useful as foams or microcellular elastomers depending on the density. These products have an integral skin which is virtually pore free. As used herein "pore free" means that the skin has substantially no pores which are visible under six powers of magnification. The presence of a substantial number of pores having a size substantially greater than that set forth above is most undesirable for many applications. For example, the presence of a substantial number of pores greater than those visible under six powers of mangification presents an extremely difficult finishing problem.

The present invention is useful in the production of numerous foams of the type comprising a cellular core covered with a non-cellular skin, such as for example, seat cushions, automobile armrests, and sun visors, life preservers, and a wide range of toys, and also in the production of microcellular elastomers, such as for example, for automobile bumpers, gaskets, vibration isolators, shoe soles, and dock pads.

DESCRIPTION OF THE PREFERRED EMBODIMENTS

The following examples are shown for the purpose of illustrating and demonstrating the invention. It will be apparent to those skilled in the art that various changes and modifications may be made therein without departing from the spirit and scope of the invention as it is more precisely defined in the subjoined claims.

Throughout the following examples parts are expressed in parts by weight based on the weight of the total reactants, unless otherwise indicated. Room temperature is to be taken to mean 26° C.

The cured products produced by the process of our invention had an integral skin of approximately 0.060 to 0.150 in thickness which was uniformly formed around the foam or microcellular elastomers and which had no substantial number of pores which were visible under six powers of magnification. Where indicated 6" x 12" x ½" test specimens were made and physical properties determined by the following tests:

Hardness Shore A (ASTM D-676-59T)
Tensile strength at break point (ASTM D-1564)
Elongation at break point (ASTM D-1564)
Tear split (ASTM D-1564)
Compression set (ASTM D-1654, Method B)

EXAMPLE 1

Test 1

100 parts of "Voranol CP 4701" hydroxyl number 31.7–36.3, refractive index 1.4532, viscosity CKS at 77° F. 860) having an average equivalent weight of about 2420, 15 parts of polytetramethylene ether glycol having an average molecular weight of 650, 1.99 parts of triethanolamine, 6.33 parts of ethylene glycol, 4 parts of ethylene oxide capped bisphenol A having an average molecular weight of 500, 0.7 part of tetramethylguanidine, 0.7 part of phenyl mercuric propionate, and 17 parts of $CCl_3F$ were mixed together at room temperature. To this mixture was added 50 parts of "Niax Isocyanate SF-50," sold by Union Carbide Corporation, New York, N.Y. "Niax Isocyanate SF-50" is a quasi-prepolymer of a triol and toluene diisocyanate having an NCO content of 32% (specific gravity at 20/20° C. 1.2427, freezing point, 2.6° C., flash point (ASTM method D92) 320° F.). The isocyanate containing mixture was machine mixed and poured into a mold which had been preheated to 30° C. After 10 minutes the foam was demolded and post cured for 3 days at room temperature.

The cured product had the physical properties disclosed in Table I below.

Test 2

Another foam with an integral skin was prepared as in Test 1 except that 18.2 parts of polypropylene ether glycol having an average molecular weight of 750 was used in place of the polytetramethylene ether glycol. The cured product had the properties reported in Table I.

TABLE I

| Test number | 1 | 2 |
|---|---|---|
| $M_c$* | 2,490 | 2,520 |
| Density (lbs./ft.³) | 12 | 12.5 |
| Tear split (p.l.i.) | 4.0 | 3.4 |
| Compression set (percent) | 14 | 10 |
| Foam tensile at break (p.s.i.) | 18 | 18 |
| Foam elongation at break (percent) | 110 | 140 |
| Skin tensile at break (p.s.i.) | 340 | 280 |
| Skin elongation at break (percent) | 105 | 115 |

*$M_c$=The average molecular weight between crosslinks which is calculated by dividing the number of moles of crosslinkers by the weight of the total reactants.

Test 1 is in accordance with our invention and was prepared to demonstrate the benefit of including polytetramethylene ether glycol in the foam formulation by comparison with Test 2 which is not an embodiment of our invention. A comparison of Tests 1 and 2 demonstrates that there was a 15–20 percent improvement in the tear split and the skin tensile strength with the addition of polytetramethylene ether glycol. It must be further noted, that the density of the foam prepared with polypropylene ether glycol had a density 5 to 10 percent higher than that of the polytetramethylene ether glycol foam. Because the relationship between density and tear is such that the greater the density the better the tear, the actual beneficial effect of formulating with polyteramehylene ether glycol is in the order of 20 to 25 percent.

EXAMPLE 2

The purpose of this example is to show the preparation of several microcellular elastomers with integral skins. Microcellular elastomers having the formulation and properties described in Table II were prepared by the procedure of Test 1.

TABLE II

| Test number | 3 | 4 | 5 | 6 |
|---|---|---|---|---|
| "CP 4701" a | 90 | 90 | 90 | |
| "31-28" b | | | | 108 |
| P-650 c | 15 | 15 | 15 | 15 |
| TEA d | 1.99 | 1.99 | 1.99 | 1.99 |
| EG e | 6.5 | 6.5 | 6.5 | 6.5 |
| EOBPA f | 4 | 4 | 4 | 4 |
| TMG g | 0.7 | 0.7 | 0.7 | 0.7 |
| Hg cat. h | 0.7 | 0.7 | 0.7 | 0.7 |
| $CCl_3F$ i | 10 | 15 | | |
| $CH_2Cl_2$ j | | | 3 | 3 |
| Isocyanate k | 50 | 50 | 50 | 50 |
| Density (lbs./ft.³) | 25 | 18 | 40.5 | 41 |
| Hardness | 61 | 56 | 79 | 92 |
| Composite tensile (p.s.i.) | 145 | 115 | 350 | 600 |
| Elongation (percent) | 80 | 80 | 90 | 80 |
| Composite split tear (p.l.i.) | 30 | 22 | 56 | 90 | a "CP 4701"="Voranol CP 4701."
b "31-28"="Niax Polyol 31-28" sold by Union CarbideCorporation, New York, N.Y. "Niax Polyol 31-28" is an ethylene oxide capped, acrylonitrile grafted, propylene oxide adduct of a low molecular weight triol and has an equivalent weight of 2,000 viscosity at 25° C., about 3,800 Csts.; average hydroxyl number approximately 27.0; flash point 310° F.
c P-650=Polytetramethylene ether glycol having an average molecular weight of 650.
d TEA=Triethanolamine.
e EG=Ethylene glycol.
f EOBPA=Ethylene oxide capped bisphenol A having an average molecular weight of 500.
g TMG=Tetramethylguanidine.
h Hg cat.="Metasol 57C/M" sold by Merck & Company, Inc., Rahway, N.J. "Metasol 57C/M" is phenyl mercuric propionate.
i $CCl_3F$=Trichlorofluoromethane.
j $CH_2Cl_2$=Dichloromethane.
k Isocyanate=A quasi-prepolymer of glycerol and toluene diisocyanate having an NCO content of 32%.

EXAMPLE 3

The purpose of this example is to shown organotin compounds as well as organomercury compounds can be used as catalysts in conjunction with tetramethylguanidine. Satisfactory polyurethane foams with integral skins having the formulation described in Table III were prepared by the procedure of Test 1.

TABLE III

| | Test No. 7 |
|---|---|
| "SF-6501" 1 | 65.5 |
| "31-28" | 54 |
| P-650 | 15 |
| TEA | 1.99 |
| EG | 6.5 |
| EOBPA | 4 |
| TMG | 0.6 |
| Stannous octoate | 0.04 |
| $CCl_3F$ | 17 |
| Isocyanate | 50 |
| Density (lbs./ft.³) | 12 |
| Tear split (p.l.i.) | 3.5 |
| Compression set (percent) | 13 |
| Foam tensile at break (p.s.i.) | 24 |
| Foam elongation at break (percent) | 150 |
| Skin tensile at break (p.s.i.) | 210 |
| Skin elongation at break (percent) | 125 |

1 "SF-6501"="Thanol SF-6501" having an average equivalent weight of about 2400, hydroxyl number range 24–27, specific gravity at 20/20 range 1.030 to 1.040, viscosity about 1220 cps. at 75° F.

From the foregoing description we consider it to be clear that the present invention contributes a substantial benefit to the polyurethane art.

We claim:

1. A molding method for preparing polyurethane foams and microcellular elastomers with integral skins which comprises the sequential steps of
    (a) a contacting under substantially anhydrous conditions
        (1) a polyol consisting of an ethylene oxide capped propylene oxide adduct of a triol selected from the group consisting of glycerol, trimethylolpropane, 1,2,4-butanetriol, and 1,2,6-hexanetriol having about 40 to about 75 percent primary hydroxyl and an average molecular weight of about 2000 to about 7000 said adduct being used in an amount between 76.5 percent and 87 percent by weight inclusive based on the weight of the polyols referred to herein in subparagraph (1), (2), (3), (4), and (5);
        (2) polytetramethylene ether glycol having an average molecular weight between 500 and 1000, said polytetramethylene ether glycol being present in an amount of from 5 to 15 percent by weight based on the weight of the total reactants;
        (3) a diol selected from the group consisting of ethylene glycol, diethylene glycol, 1,4-butanediol, and phenyl diethanolamine, said diol present in an amount of 1 to 10 percent by weight based on the weight of the total reactants;
        (4) a polyol consisting of ethylene oxide capped 4,4'-isopropylidene diphenol, said ethylene oxide capped 4,4'-isopropylidene diphenol being present in an amount of from 10 to 20 percent by weight based on the weight of the polyols referred to herein in subparagraphs (2), (3), (4), and (5); and
        (5) a second triol selected from the group consisting of glycerol, trimethylolpropane, 1,2,4-butanetriol, 1,2,6-hexanetriol, and triethanolamine, said triol being present in an amount of 0.5 to 10 percent by weight based on the weight of the polyols referred to herein in subparagraphs (2), (3), (4), and (5)
    simultaneously with a quasi prepolymer of toluene diisocyanate and a third triol selected from the group consisting of glycerol, trimethylolpropane, 1,2,4-butanetriol, and 1,2,6-hexanetriol, said quasi prepolymer having an NCO content of about 20 to 40 percent, said quasi prepolymer being used in approximately the theoretical amount necessary to react with the polyols referred to above in paragraphs (1), (2), (3), (4), and (5); said simultaneous contacting taking place in the presence of a catalyst system consisting of a tetraalkylguanidine or an isocyanate adduct thereof and mercury and tin salts of carboxylic acids; and in the presence of a blowing agent vaporizes under the contacting conditions;
    (b) pouring the contacted mixture into a mold which is preheated to a temperature between about 30° C. and 55° C.;
    (c) permitting the contents of the mold to cure in contact with the mold; and
    (d) removing the resulting self-supporting polyurethane product from the mold.

2. A homogeneous liquid polyurethane extender system which consists essentially of 20 to 60 percent by weight of polytetramethylene ether glycol having an average molecular weight between 500 and 1000; 10 to 50 percent by weight of a diol selected from the group consisting of ethylene glycol, diethylene glycol, 1,4-butanediol, and phenyldiethanolamine; 10 to 20 percent by weight of ethylene oxide capped 4,4'-isopropylidenediphenol; and 0.5 to 10 percent by weight of a triol selected from the group consisting of glycerol, trimethylolpropane, 1,2,4-butanetriol, 1,2,6-hexanetriol, and triethanolamine.

References Cited
UNITED STATES PATENTS

| 3,637,536 | 1/1972 | Ring | 260—2.5 AZ |
| 3,632,707 | 1/1972 | Rice | 260—2.5 AZ |
| 3,591,532 | 7/1971 | Abercrombie | 260—2.5 AP |
| 3,575,896 | 4/1971 | Khan | 260—2.5 AM |
| 3,555,130 | 1/1971 | Feuer | 260—2.5 AZ |
| 3,467,606 | 9/1969 | Rice | 260—2.5 AP |
| 3,178,490 | 4/1965 | Petrino | 264—DIG. 014 |
| 3,238,154 | 3/1966 | Mosso | 260—2.5 AC |

FOREIGN PATENTS

| 1,063,508 | 3/1967 | Great Britain | 260—2.5 AC |

HOSEA E. TAYLOR, Primary Examiner

C. W. IVY, Assistant Examiner

U.S. Cl. X.R.

252—182; 260—2.5 AC, 2.5 AM, 2.5 AP; 264—48, Dig. 14